US010599799B1

(12) United States Patent
Zhu et al.

(10) Patent No.: US 10,599,799 B1
(45) Date of Patent: Mar. 24, 2020

(54) LOW-DROPOUT REGULATOR AND CHARGE PUMP MODELING USING FREQUENCY-DOMAIN FITTING METHODS

(71) Applicant: Ansys, Inc., Canonsburg, PA (US)

(72) Inventors: Deqi Zhu, Santa Clara, CA (US); Yi Cao, San Jose, CA (US); Shan Wan, Saratoga, CA (US); Norman Chang, Fremont, CA (US)

(73) Assignee: ANSYS, Inc., Canonsburg, PA (US)

( * ) Notice: Subject to any disclaimer, the term of this patent is extended or adjusted under 35 U.S.C. 154(b) by 287 days.

(21) Appl. No.: 15/792,886

(22) Filed: Oct. 25, 2017

Related U.S. Application Data

(60) Provisional application No. 62/413,152, filed on Oct. 26, 2016.

(51) Int. Cl.
| | | |
|---|---|---|
| *G06F 17/50* | (2006.01) | |
| *H02M 3/07* | (2006.01) | |
| *H02M 3/156* | (2006.01) | |
| *G05F 1/56* | (2006.01) | |

(52) U.S. Cl.
CPC ............ *G06F 17/5045* (2013.01); *G05F 1/56* (2013.01); *G06F 17/5036* (2013.01); *G06F 17/5063* (2013.01); *H02M 3/07* (2013.01); *H02M 3/156* (2013.01); *G06F 2217/78* (2013.01); *H02M 2003/077* (2013.01)

(58) Field of Classification Search
CPC .. G06F 17/50; G06F 17/5036; G06F 17/5045; G06F 17/5063; G06F 2217/78; G05F 1/46; G05F 1/462; G05F 1/465; G05F 1/56; H02M 3/156
See application file for complete search history.

(56) References Cited

U.S. PATENT DOCUMENTS

| | | | | |
|---|---|---|---|---|
| 7,945,889 B2* | 5/2011 | Hsu | ...................... | G06F 17/5036 703/13 |
| 9,811,619 B2* | 11/2017 | Atwell | ................ | G06F 17/5036 |

OTHER PUBLICATIONS

Gustavsen et al., "Rational approximation of frequency domain responses by vector fitting," IEEE Transactions on Power Delivery, vol. 14, No. 3, Jul. 1999 (Year: 1999).*

\* cited by examiner

*Primary Examiner* — Patrick O Neill

(74) *Attorney, Agent, or Firm* — Jones Day

(57) ABSTRACT

Computer-implemented systems and methods for modeling low-dropout (LDO) regulators and charge pumps are provided. A relationship between an output voltage of an LDO regulator or charge pump and a loading condition is determined. A frequency-domain analysis is performed at multiple frequencies to determine an impedance function representative of an impedance of the LDO regulator or charge pump at each of the multiple frequencies. A vector-fitting algorithm is applied to approximate the impedance function using a plurality of poles and residues. A circuit is synthesized based on the plurality of poles and residues. A model for the LDO regulator or charge pump is generated, where the model includes the synthesized circuit and components that model the relationship between the output voltage and the loading condition.

14 Claims, 12 Drawing Sheets

$$\sum \frac{r}{s-p} + \frac{\bar{r}}{s-\bar{p}} \quad p = \alpha + \beta j \quad r = C + dj$$

$$\frac{C+dj}{(s-\alpha)+\beta j} + \frac{C-dj}{(s-\alpha)-\beta j}$$

$$= \frac{(s-\alpha)C - C\beta j + dj(s-\alpha) + d\beta + (s-\alpha)C + \beta d + C\beta j - dj(s-\alpha)}{(s-\alpha)^2 + \beta^2}$$

$$= \frac{2(s-\alpha)C + 2\beta d - \cancel{C\beta j} + \cancel{dj}j - \cancel{\alpha dj} + \cancel{C\beta j} - \cancel{sdj} + \cancel{\alpha dj}}{s^2 - 2\alpha s + \alpha^2 + \beta^2}$$

$$= \frac{2S - 2\alpha C + 2\beta d}{S^2 - 2\alpha S + \alpha^2 + \beta^2}$$

$$= \frac{1}{\frac{R + SL + S^2 LC}{RSL}} = \frac{RL \cdot S}{S^2 LC + SL + R} = \frac{\frac{R}{C} S}{S^2 + \frac{1}{C} S + \frac{R}{LC}}$$

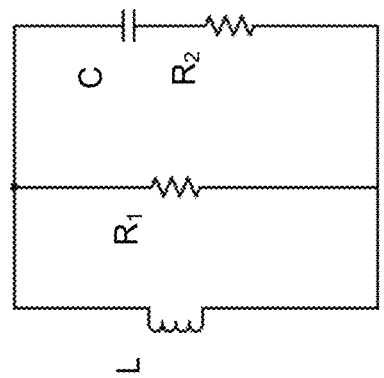

FIG. 3B

LOW-DROPOUT REGULATOR AND CHARGE PUMP MODELING USING FREQUENCY-DOMAIN FITTING METHODS

CROSS-REFERENCE TO RELATED APPLICATIONS

This application claims priority to U.S. Provisional Patent Application No. 62/413,152, filed Oct. 26, 2016, entitled "Low-Dropout Regulator and Charge Pump Modeling Using Frequency-Domain Fitting Methods," the entirety of which is herein incorporated by reference.

FIELD

The present description relates to computer-based techniques for modeling low-dropout regulators and charge pumps using frequency-domain fitting methods.

BACKGROUND

Power regulators are commonly used to provide a stable power supply voltage independent of load impedance, input voltage variations, temperature, and time. A low-dropout (LDO) regulator is a type of voltage regulator that can provide a low dropout voltage, i.e., a small input-to-output differential voltage, thus allowing the LDO regulator to maintain regulation with small differences between input voltage and output voltage. LDO regulators are used in a variety of applications (e.g., providing an on-chip power supply, etc.).

A charge pump is a type of DC-to-DC converter that uses capacitors as energy-storage elements to create a power source. Charge pumps are used in a variety of applications (e.g., providing an on-chip power supply that supplies power from a limited external power supply, etc.).

SUMMARY

Computer-implemented systems and methods for modeling low-dropout (LDO) regulators and charge pumps are provided. In an example computer-implemented method for modeling an LDO regulator, a relationship between an output voltage of the LDO regulator and a loading condition is determined. A frequency-domain analysis is performed at multiple frequencies to determine an impedance function representative of the LDO regulator's impedance at each of the multiple frequencies. A vector-fitting algorithm is applied to approximate the impedance function using a plurality of poles and residues. A circuit is synthesized based on the plurality of poles and residues. A model for the LDO regulator is generated, where the model includes the synthesized circuit and components that model the relationship between the output voltage and the loading condition.

An example computer-implemented system for modeling an LDO regulator includes a processing system and a computer-readable memory in communication with the processing system encoded with instructions for commanding the processing system to execute steps. In executing the steps, a relationship between an output voltage of the LDO regulator and a loading condition is determined. A frequency-domain analysis is performed at multiple frequencies to determine an impedance function representative of the LDO regulator's impedance at each of the multiple frequencies. A vector-fitting algorithm is applied to approximate the impedance function using a plurality of poles and residues. A circuit is synthesized based on the plurality of poles and residues. A model for the LDO regulator is generated, where the model includes the synthesized circuit and components that model the relationship between the output voltage and the loading condition.

An example non-transitory computer-readable storage medium for modeling an LDO regulator comprises computer executable instructions which, when executed, cause a processing system to execute steps. In executing the steps, a relationship between an output voltage of an LDO regulator and a loading condition is determined. A frequency-domain analysis is performed at multiple frequencies to determine an impedance function representative of the LDO regulator's impedance at each of the multiple frequencies. A vector-fitting algorithm is applied to approximate the impedance function using a plurality of poles and residues. A circuit is synthesized based on the plurality of poles and residues. A model for the LDO regulator is generated, where the model includes the synthesized circuit and components that model the relationship between the output voltage and the loading condition.

In an example computer-implemented method for modeling a charge pump, a relationship between an output voltage of the charge pump and a loading condition is determined. A frequency-domain analysis is performed at multiple frequencies to determine an impedance function representative of the charge pump's impedance at each of the multiple frequencies. A vector-fitting algorithm is applied to approximate the impedance function using a plurality of poles and residues. A circuit is synthesized based on the plurality of poles and residues. A model for the charge pump is generated, where the model includes the synthesized circuit and components that model the relationship between the output voltage and the loading condition.

An example computer-implemented system for modeling a charge pump includes a processing system and a computer-readable memory in communication with the processing system encoded with instructions for commanding the processing system to execute steps. In executing the steps, a relationship between an output voltage of the charge pump and a loading condition is determined. A frequency-domain analysis is performed at multiple frequencies to determine an impedance function representative of the charge pump's impedance at each of the multiple frequencies. A vector-fitting algorithm is applied to approximate the impedance function using a plurality of poles and residues. A circuit is synthesized based on the plurality of poles and residues. A model for the charge pump is generated, where the model includes the synthesized circuit and components that model the relationship between the output voltage and the loading condition.

An example non-transitory computer-readable storage medium for modeling a charge pump comprises computer executable instructions which, when executed, cause a processing system to execute steps. In executing the steps, a relationship between an output voltage of the charge pump and a loading condition is determined. A frequency-domain analysis is performed at multiple frequencies to determine an impedance function representative of the charge pump's impedance at each of the multiple frequencies. A vector-fitting algorithm is applied to approximate the impedance function using a plurality of poles and residues. A circuit is synthesized based on the plurality of poles and residues. A model for the charge pump is generated, where the model includes the synthesized circuit and components that model the relationship between the output voltage and the loading condition.

The subject matter described herein provides many technical advantages. As described below, the computer-based techniques of the present disclosure improve the functioning of a computer system as compared to conventional approaches because the techniques described herein enable modeling of components (e.g., LDO regulators, charge pumps, etc.) in a manner that is more efficient (e.g., faster, with smaller memory requirements, etc.) and/or has a reduced processing burden as versus the conventional approaches. The computer-based techniques described herein achieve such improvements through the use of processes that provide a frequency-domain analysis of components (e.g., as opposed to conventional approaches' use of time-domain analyses). As described below, the frequency-domain analysis enables stable and relatively simple models to be produced, in contrast to the unstable and highly complicated models produced via conventional time-domain approaches. The computer-based techniques also achieve the aforementioned improvements through the use of processes that generate a model for a component that is not dependent on a load or power delivery network (PDN) to which the modeled component is coupled. By generating the model in this manner, the model produces accurate simulation results for a variety of different loads and PDNs, and a new model need not be derived each time that the load or PDN changes. Through the use of such processes, the techniques of the present disclosure achieve the above-described improvements to the functioning of the computer system and improve the accuracy of simulation results. These technical advantages and others are described in detail below.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3B depicts an equivalent circuit for complex pole pair of impedance according to an embodiment of the present disclosure.

DETAILED DESCRIPTION

The present disclosure relates generally to low-dropout (LDO) voltage regulators and charge pumps. LDO regulators are used in a variety of different systems to provide an on-chip power supply and reduce a number of VDD power supplies, among other applications. Likewise, charge pumps are used on chips in a variety of designs and applications (e.g., high-voltage applications, etc.). For instance, charge pumps are commonly used on power-management integrated circuits (ICs), among others.

The present inventors have observed a need for improved techniques for modeling LDO regulators and charge pumps. Specifically, the present inventors have observed a need for more accurate LDO regulator and charge pump models that enable a variety of different analyses to be performed (e.g., dynamic voltage (IR) drop analyses, power integrity analyses, etc.) and further enable optimization of phase margin and stability for different loading and PDN conditions.

Embodiments of the present disclosure are directed to computer-implemented systems and methods that may satisfy one or more of these needs. Accordingly, the present disclosure provides computer-implemented systems and methods for generating models of LDO regulators and charge pumps. After being generated, such models can be used in circuit analysis tools (e.g., SPICE-compatible circuit analysis tools) to analyze the behavior of LDO regulators and charge pumps within the contexts of various systems and chips. For example, in some embodiments, the circuit analysis tool includes an IR drop analysis tool (e.g., Redhawk, Totem, etc.) for analyzing the behavior of the LDO regulator or charge pump when coupled to a load or PDN.

As described in further detail below, the LDO regulator and charge pump models of the present disclosure are generated via a frequency-domain fitting method. By generating the LDO regulator model or charge pump model using a frequency-domain analysis instead of a time-domain analysis, the resulting model is not dependent on characteristics (e.g., impedance) of a PDN or load to which the LDO regulator or charge pump is coupled. Accordingly, the model produces accurate simulation results for a variety of different loads and PDNs, and a new model need not be derived each time that the load or PDN changes. Conventional models of LDO regulators and charge pumps are dependent on characteristics of the PDN or load, such that these conventional models produce less accurate simulation results when used with different PDN or loading conditions. This is described in further detail below.

Figure 1:
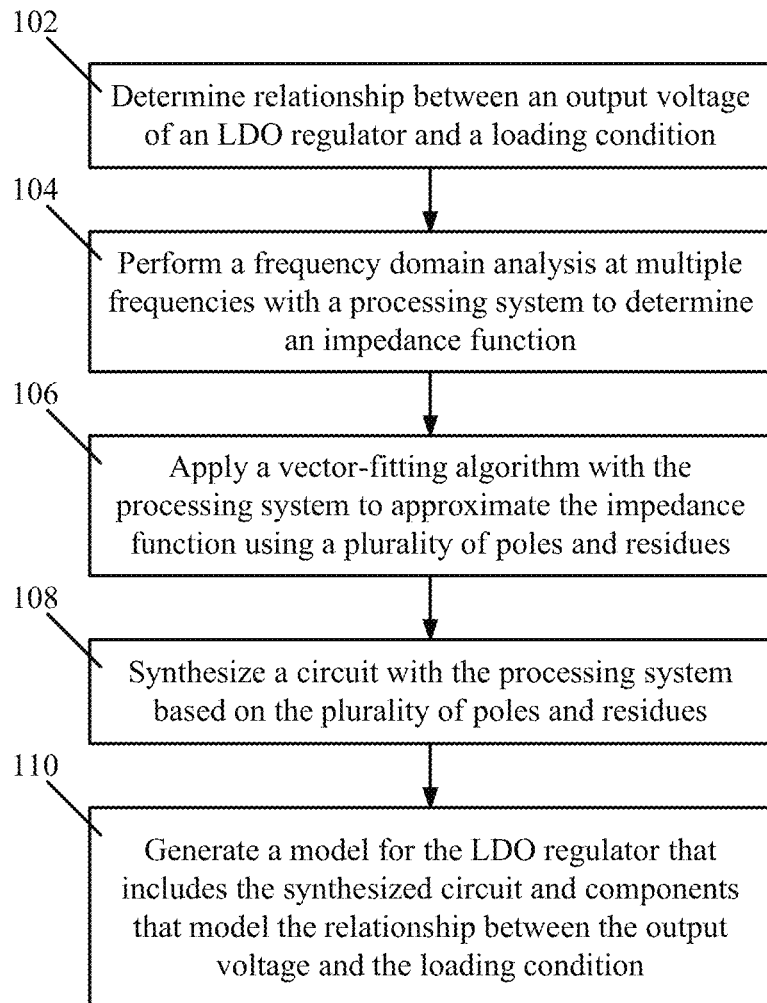
FIG. 1 is a flowchart depicting steps of an exemplary method of modeling an LDO regulator according to an embodiment of the present disclosure.

To illustrate features of the computer-implemented systems and methods described herein, reference is made to FIG. 1. This figure is a flowchart depicting steps of an exemplary method of modeling an LDO regulator according to an embodiment of the present disclosure. It is noted that in embodiments, some of the steps of FIG. 1 are performed simultaneously and not necessarily sequentially, and that in embodiments, the ordering of the steps varies from that depicted in the figure. At 102, a relationship between an output voltage of the LDO regulator and a loading condition is determined. In embodiments, a computer-implemented DC analysis of the LDO regulator is performed to determine this relationship, with the determined relationship being representative of a low-frequency behavior (e.g., DC behavior) of the LDO regulator. In some embodiments, as loading on the LDO regulator increases, the output voltage of the LDO regulator decreases, and the relationship determined at the operation 102 is representative of this. Likewise, in some embodiments, as loading on the LDO regulator decreases, the output voltage of the LDO regulator increases, and the relationship determined at the operation 102 is representative of this.

Figure 2A:
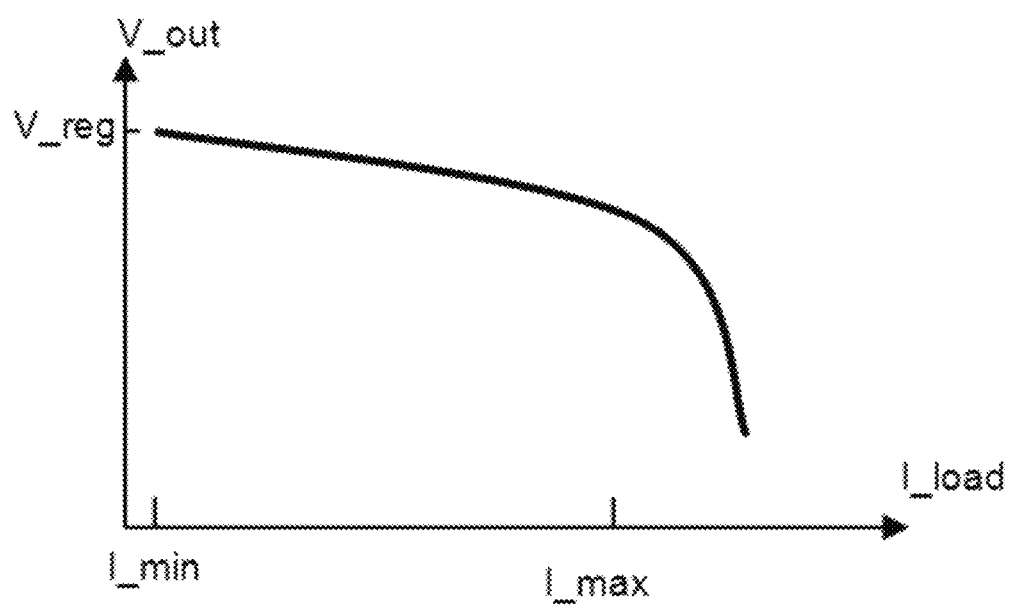
FIG. 2A depicts DC characteristics of an exemplary LDO regulator according to an embodiment of the present disclosure.

In embodiments, the determining of the relationship at 102 utilizes computer-implemented techniques (e.g., computer algorithms) to generate a data structure (e.g., table) that is stored in a non-transitory computer-readable storage medium. The generated data structure includes multiple entries, where each entry includes (i) an amount of current delivered to a load to which the LDO regulator is coupled (e.g., Iload), and (ii) the LDO regulator's output voltage (e.g., Vout) when the amount of current is being delivered. In embodiments, the data structure is a DC Iload-Vout table, as determined via the aforementioned computer-implemented DC analysis. The entries of the table are representative of the relationship described above, whereby the output voltage of the LDO regulator decreases as loading on the LDO regulator increases, and the output voltage of the LDO regulator increases as loading on the LDO regulator decreases. In embodiments, the DC Iload-Vout table is generated via an automatic, algorithmic analysis that requires no human intervention or only minimal human intervention. In embodiments, circuit analysis tools (e.g., Hspice, Nspice, Spectre, etc.) and DC characterization setup (e.g., LDO's SPICE subckt netlist, device model library, setup configuration, etc.) are used to simulate the LDO regulator's DC characteristic. A typical LDO's DC characteristics (V-I) are shown in FIG. 2A, where V_reg is the regulated output voltage, and I_min and I_max are minimum and maximum loading current, respectively. In embodiments, the Iload and Vout values shown in the graph of FIG. 2A can be put into tabular format to form the aforementioned DC Iload-Vout table.

Figure 2B:
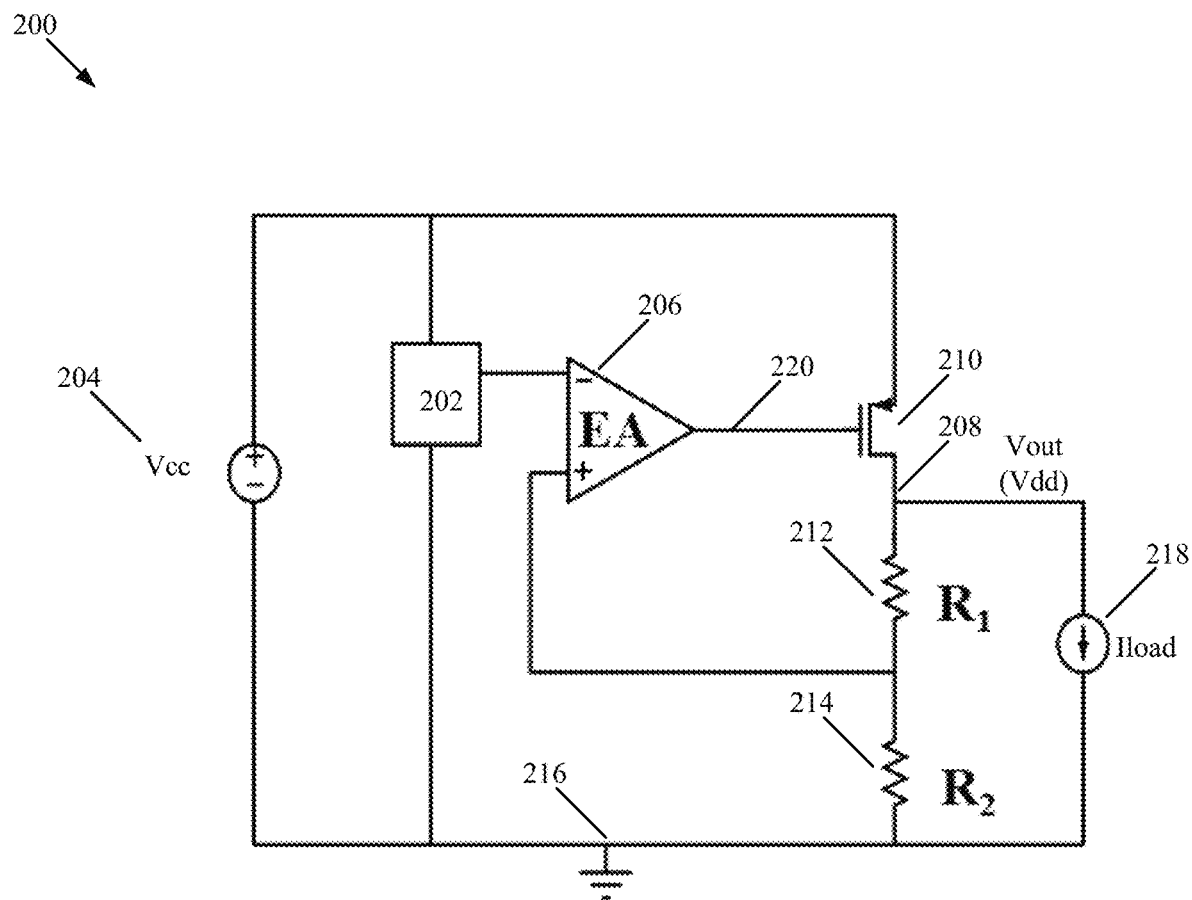
FIG. 2B is a circuit diagram of an exemplary LDO regulator according to an embodiment of the present disclosure.

To illustrate the Iload and Vout values representative of the LDO regulator's low frequency behavior, reference is made to FIG. 2B. This figure is a circuit diagram of an exemplary LDO regulator 200 according to an embodiment of the present disclosure. The LDO regulator 200 includes a reference voltage supply circuit 202 that outputs a reference voltage based on an input supply voltage Vcc 204. The LDO regulator 200 of FIG. 2B further includes an error amplifier 206 (i.e., a differential amplifier). The error amplifier 206 has first and second inputs, and the first input is coupled to the reference voltage supply circuit 202, enabling the first input to receive the reference voltage. The second input is coupled to an output node 208 of the LDO regulator 200 via a first feedback resistor R1. The second input is further coupled to a ground node 216 via a second feedback resistor R2. The error amplifier 206 has a single-ended output 220.

The single-ended output 220 of the error amplifier 206 is coupled to a pass transistor 210. In the example of FIG. 2B, the pass transistor 210 is a p-type MOS transistor. It should be understood that the p-type MOS transistor used in the example of FIG. 2B is exemplary only, and that in other examples, an n-type MOS transistor or another type of transistor is used as the pass transistor 210.

A voltage present at the second input of the error amplifier 206 is a fraction of an output voltage Vout of the LDO regulator 200, with the fraction being determined based on a ratio of resistance values of the feedback resistors R1 and R2. In the error amplifier 206, the voltage at the second input is compared to the reference voltage received at the first input. The error amplifier 206 is configured to drive the pass transistor 210 to an appropriate operating point that ensures the output voltage Vout at the output node 208 is at a correct voltage. As the operating current or other conditions change, the error amplifier 206 modulates the pass transistor 210 to maintain the correct Vout output voltage. In embodiments, the Vout output voltage is referred to as a "Vdd" output voltage. In these embodiments, the LDO regulator receives the input supply voltage Vcc 204 and generates an output that is the Vdd output voltage.

The example LDO regulator 200 may be used to provide power to a load. Thus, the output voltage Vout of the LDO regulator 200 is provided to the load, in embodiments. A current that passes through the load when the output voltage Vout is being delivered is the Iload current 218 shown in FIG. 2B. The low frequency behavior (e.g., DC behavior) of the LDO regulator 200 determined via the DC analysis may be represented via the aforementioned DC Iload-Vout table, where Iload values represented in the table are indicative of the Iload 218 shown in FIG. 2B, and Vout values represented in the table are indicative of the Vout voltage present at the output node 208 shown in FIG. 2B.

With reference again to FIG. 1, at 104, a frequency-domain analysis is performed at multiple frequencies to determine an impedance function Z(s) representative of the LDO regulator's impedance at each of the multiple frequencies. In some embodiments, the frequency-domain analysis performed at the step 104 is an AC analysis (e.g., in contrast to the DC analysis described above) that is used to determine an AC behavior of the LDO regulator. In some embodiments, the AC analysis is performed using an AC model of the LDO regulator.

Figure 3A:
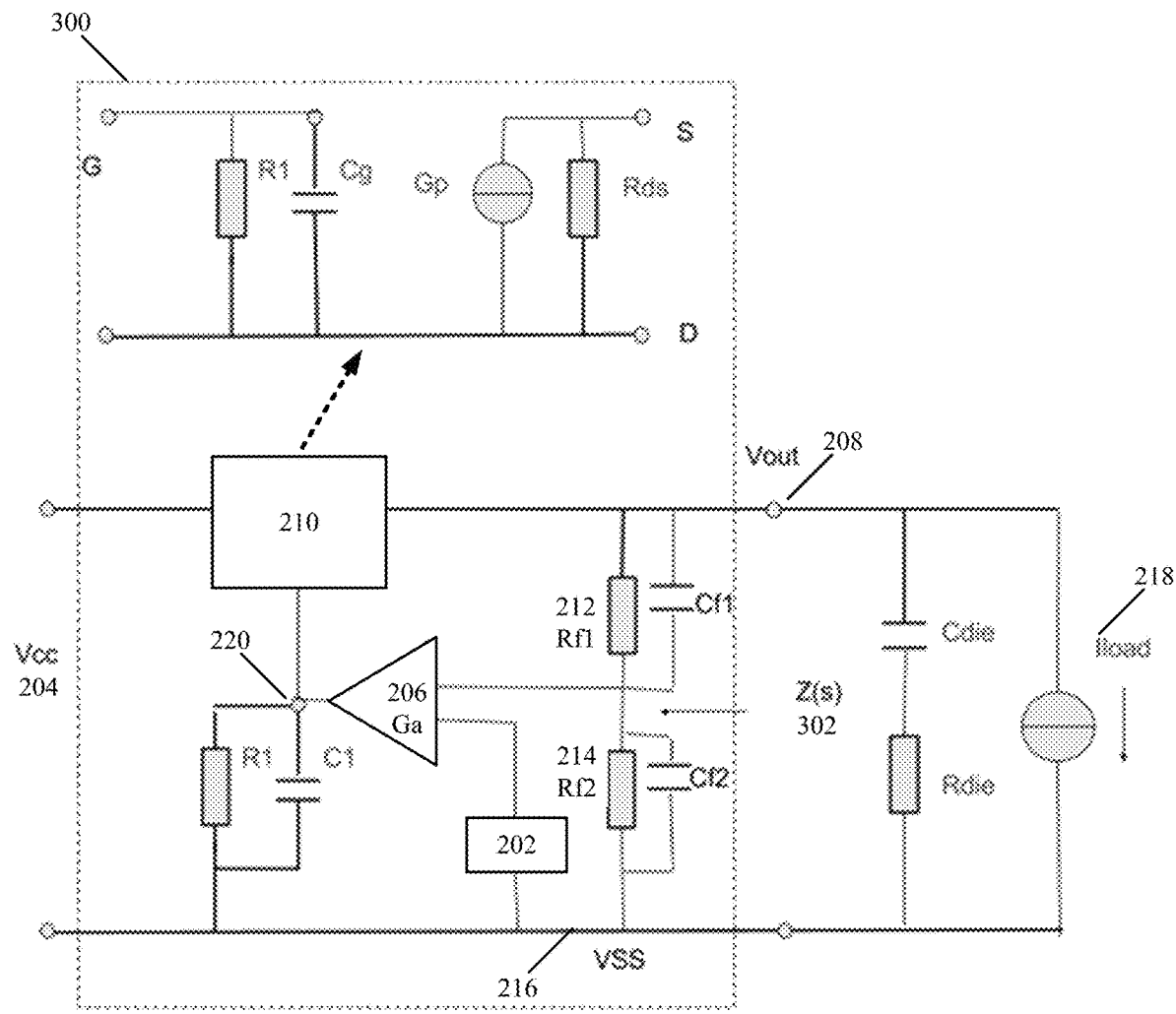
FIG. 3A depicts an exemplary AC model of an LDO regulator used in performing an AC analysis of the LDO regulator according to an embodiment of the present disclosure.

To illustrate an example of such an AC model, reference is made to FIG. 3A. This figure depicts an exemplary AC model 300 that is used in performing an AC analysis of the LDO regulator according to embodiments of the present disclosure. The AC model 300 includes features corresponding to the features 202, 204, 206, 208, 210, 212, 214, 216, 218, 220 described above with reference to FIG. 2B, and in the interest of conciseness, the description of these features is not repeated here. The AC model 300 includes additional other components (e.g., components R1, C1, Cf1, Cf2, Cg, Gp, and Rds shown in FIG. 3A). The pass element 210 is modeled via the components R1, Cg, Gp, and Rds, as shown in the figure.

It is noted that the AC model 300 includes features for modeling each of the four basic elements of the LDO regulator: (i) feature Gp is used in modeling the pass element of the LDO regulator, (ii) feature Ga is used in modeling the error amplifier of the LDO regulator, (iii) Rf1 and Rf2 are used in modeling the feedback network of the LDO regulator, and (iv) R1 and C1 are used in modeling the output impedance (e.g., Zout) of the error amplifier. In the example of FIG. 3A, the AC model 300 is coupled to a load, as represented by the Cdie, Rdie, and Iload 218 features. The Cdie and Rdie features are representative of a capacitance and resistance, respectively, of the load or die to which the LDO regulator is coupled.

In FIG. 3A, the LDO frequency-domain impedance function Z(s) is shown at 302. The AC model 300 may be understood as having three (3) main poles and zeros, and thus, in embodiments of an impedance-fitting procedure described below, the Z(s) function is fitted by choosing three pairs of complex poles and residues. In some embodiments, the impedance function Z(s) may be referred to as a "transfer function" of the LDO regulator. As described above, in embodiments, a frequency-domain analysis is performed at multiple frequencies to determine the impedance function Z(s), which is representative of the LDO regulator's impedance at each of the multiple frequencies. In some embodiments, the frequency-domain analysis comprises an automatic, algorithmic analysis of the LDO regulator that requires no human intervention or only minimal human intervention. In embodiments, the frequency-domain analysis is an AC analysis performed using an AC model of the LDO regulator, such as the AC model illustrated in FIG. 3A. In embodiments, the AC model analysis is performed using circuit analysis tools (e.g., Hspice, Nspice, Spectre, etc) and an AC characterization setup (e.g., LDO's SPICE subckt netlist, device model library, and AC setup configuration) to simulate the LDO output port impedance.

With reference again to FIG. 1, at 106, a vector-fitting algorithm is applied to approximate the impedance function Z(s) using a plurality of poles and residues. In some embodiments, the vector-fitting algorithm comprises a rational-vector fitting method that approximates the impedance function Z(s) via an equation $$Z(s) \approx \sum_{n=1}^{3} \frac{r}{s-p} + hs + d, \qquad \text{(Equation 1)}$$

where s represents a frequency of the multiple frequencies, Z(s) represents the impedance function, r represents the residues, p represents the poles, and d and h represent real numbers. In the equation above, the impedance function Z(s) is the impedance function of the LDO regulator, as determined via the frequency-domain analysis described above with reference to operation 104 of FIG. 1. The output of the rational-vector fitting method comprises the residues r and poles p, which are either real quantities or complex conjugate pairs. The values d and h in the equation are real quantities, as noted above.

In embodiments, the vector-fitting algorithm comprises an automatic, algorithmic analysis that requires no human intervention or only minimal human intervention. In embodiments, the rational vector fitting method is based on the paper "Rational approximation of frequency domain responses by vector fitting," by Bjorn Gustaysen et al., IEEE Transactions on Power Delivery, Vol. 14, No. 3, July 1999, which is incorporated herein by reference in its entirety.

At 108, a circuit is synthesized based on the plurality of poles and residues determined via the operation 106. The synthesized circuit represents the AC, frequency-response behavior of the LDO regulator, in embodiments. The circuit that is synthesized at 108 may be a second-order circuit when the residues and poles are complex conjugate pairs and a first-order circuit when the residues and poles are real quantities. In embodiments, the synthesis of the circuit via the operation 108 comprises an automatic, algorithmic synthesis procedure that requires no human intervention or only minimal human intervention. In embodiments, synthesis of complex residues and poles to equivalent R1, L, C, R2, elements is relatively straightforward. For example, an equivalent circuit for complex pole pair of impedance is shown in FIG. 3B, wherein firstly, the corresponding transfer function is obtained using conjugate residues and poles, and then the R1, L, C, R2 are obtained.

Figure 4:
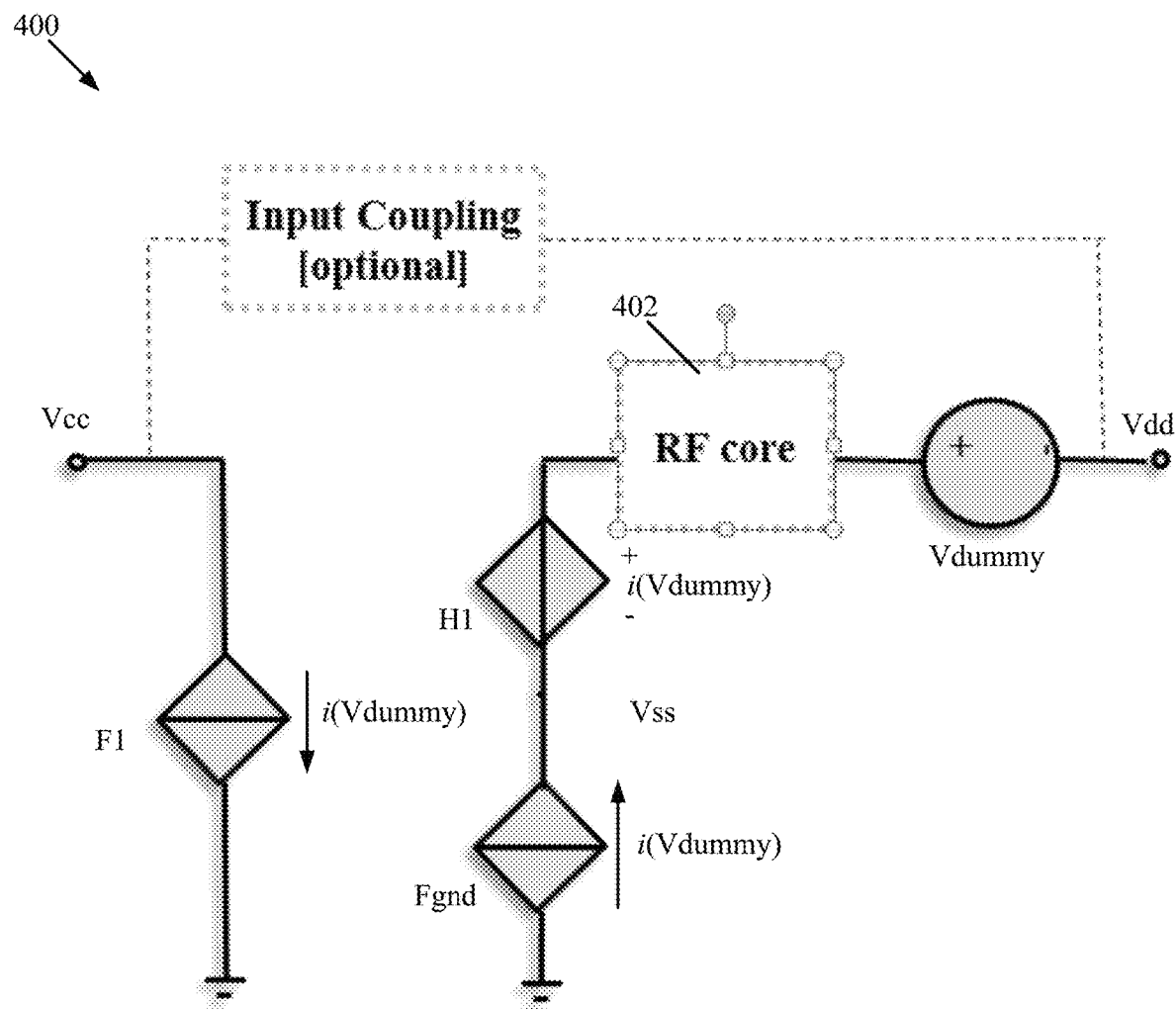
FIG. 4 depicts an exemplary model for an LDO regulator that includes a synthesized circuit and components that model a DC behavior of the LDO regulator according to an embodiment of the present disclosure.

At 110, a model for the LDO regulator is generated. The generated model includes (i) the circuit synthesized at the operation 108, and (ii) components that represent the low-frequency behavior (e.g., DC behavior) of the LDO regulator, as captured in the DC Iload-Vout table described above. To illustrate an example model for the LDO regulator that may be generated via the operation 110, reference is made to FIG. 4. This figure depicts an exemplary model 400 for an LDO regulator that includes the synthesized circuit and components that model the DC behavior of the LDO regulator according to an embodiment of the present disclosure. In FIG. 4, "Vcc" is the input voltage to the model 400, and "Vdd" is the output voltage. The RF core 402 represents the circuit that is synthesized via the operation 108, with the synthesized circuit capturing the AC, frequency response behavior of the LDO regulator, as noted above.

Other features included in the model 400 represent the DC behavior of the LDO regulator, as determined via the operation 102 described above. The DC behavior of the LDO regulator (e.g., as captured in the DC Iload-Vout table generated via the operation 102) dictates that when loading increases, the Vdd output voltage of the LDO regulator decreases accordingly. The H1 feature shown in FIG. 4 is used to represent this DC behavior in the model 400 and comprises a current-controlled voltage source, in embodiments. The current-controlled voltage source operates such that as loading increases, the output voltage Vdd decreases. The F1 and Fgnd features are current sources, in embodiments, and are used to ensure that the model 400 satisfies Kirchoff's Current Laws (KCL). The Vdummy feature comprises a voltmeter, in embodiments. The model 400 optionally includes input coupling, as shown in FIG. 4. In embodiments, the input coupling is performed in a static manner that assumes an LDO's input is kept ideal at its nominal value. In embodiments, the input variation effect on LDO's output is considered. This is the so-called line regulation effect.

In embodiments, the generation of the model via the operation 110 comprises an automatic, algorithmic procedure that requires no human intervention or only minimal human intervention. In generating the model, converting the DC I-V table to H element is relatively straightforward, where the H element is a current-controlled voltage source, and the I-V table is equivalent to a Piece-Wise Linear format current-controlled voltage source. F1 and Fgnd are current-controlled current sources, and they make the LDO model satisfy KCL rule.

After generating the model of the LDO regulator via the operation 110, the model can thereafter be used in circuit analysis tools to analyze the behavior of the LDO regulator within the contexts of various systems and chips. For example, in some embodiments, the circuit analysis tool includes an IR drop analysis tool (e.g., Redhawk, Totem, etc.) that analyzes the behavior of the LDO regulator when coupled to a load or PDN. Various other analyses can be performed by applying the generated model in a circuit analysis tool.

In conventional approaches to modeling an LDO regulator, time-domain analyses of the LDO regulator's behavior are performed. Such time-domain analyses are highly complicated and very time consuming. Further, in the conventional approaches to modeling an LDO regulator, the model that is generated is highly dependent on a load or PDN to which the LDO regulator is coupled. As a result of this dependency, the LDO regulator and the coupled load or PDN must be solved together. This is undesirable because a new model must be generated for each different load or PDN, resulting in a very time-consuming procedure. Further, this conventional model produces low-accuracy simulation results when used with different PDN or loading conditions.

In contrast to the conventional approaches, the techniques of the present disclosure implement computer-based processes that provide a frequency-domain analysis of an LDO regulator. The frequency-domain analysis enables a stable and relatively simple LDO regulator model to be produced, in contrast to the unstable and highly complicated models produced via the time-domain approaches. The techniques of the present disclosure also implement computer-based processes that generate an LDO regulator model that is not dependent on a load or PDN to which the LDO regulator is coupled. By generating the LDO regulator model in this manner, the model produces accurate simulation results for a variety of different loads and PDNs, and a new model need not be derived each time that the load or PDN changes. Through the use of such processes, the techniques of the present disclosure improve the functioning of a computer system as compared to the conventional approaches because the techniques described herein enable modeling of the LDO regulator in a manner that is more efficient (e.g., faster, with smaller memory requirements, etc.) and/or has a reduced processing burden as versus the conventional approaches.

Figure 5:
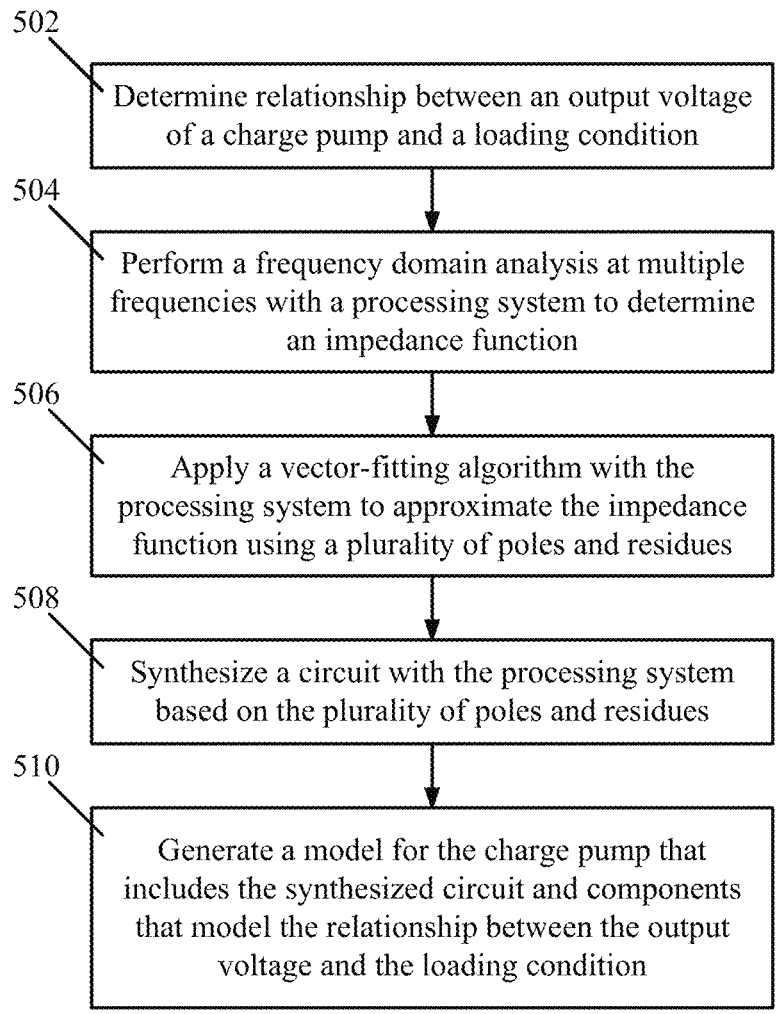
FIG. 5 is a flowchart depicting steps of an exemplary method of modeling a charge pump according to an embodiment of the present disclosure.

FIG. 5 is a flowchart depicting steps of an exemplary method of modeling a charge pump according to an embodiment of the present disclosure. It is noted that in embodiments, some of the steps of FIG. 5 are performed simultaneously and not necessarily sequentially, and that in embodiments, the ordering of the steps varies from that depicted in the figure. At 502, a relationship between an output voltage of the charge pump and a loading condition is determined (e.g., based on data extracted from a physical system or data associated with a physical system being designed or whose design is being modified). In embodiments, a computer-implemented DC analysis of the charge pump is performed to determine this relationship, with the determined relationship being representative of a low-frequency behavior (e.g., DC behavior) of the charge pump. In some embodiments, as loading on the charge pump increases, the output voltage of the charge pump decreases, and the relationship determined at the operation 502 is representative of this. Further, in embodiments, as loading on the charge pump decreases, the output voltage of the charge pump increases, and the relationship determined at the operation 502 is representative of this.

In embodiments, the determining of the relationship utilizes computer-implemented techniques (e.g., computer algorithms) to generate a data structure (e.g., table) that is stored in a non-transitory computer-readable storage medium. The generated data structure includes multiple entries, where each entry includes (i) an amount of current delivered to a load to which the charge pump is coupled (e.g., Iload), and (ii) the charge pump's output voltage (e.g., Vout) when the amount of current is being delivered. In embodiments, the data structure is a DC Iload-Vout table, as determined via the aforementioned computer-implemented DC analysis. The entries of the table are representative of the relationship described above, whereby the output voltage of the charge pump decreases as loading on the charge pump increases, and the output voltage of the charge pump increases as loading on the charge pump decreases. In embodiments, the DC Iload-Vout table is generated via an automatic, algorithmic analysis of the charge pump that requires no human intervention or only minimal human intervention. The DC Iload-Vout table for the charge pump is generated in a manner that is similar to that described above for generating the DC Iload-Vout table for the LDO regulator.

At 504, a frequency-domain analysis is performed at multiple frequencies to determine an impedance function $Z(s)$ representative of the charge pump's impedance at each of the multiple frequencies. In some embodiments, the frequency-domain analysis performed at the step 504 is an AC analysis that is used to determine an AC behavior of the charge pump. In some embodiments, the AC analysis is performed using an AC model of the charge pump.

Figure 6:
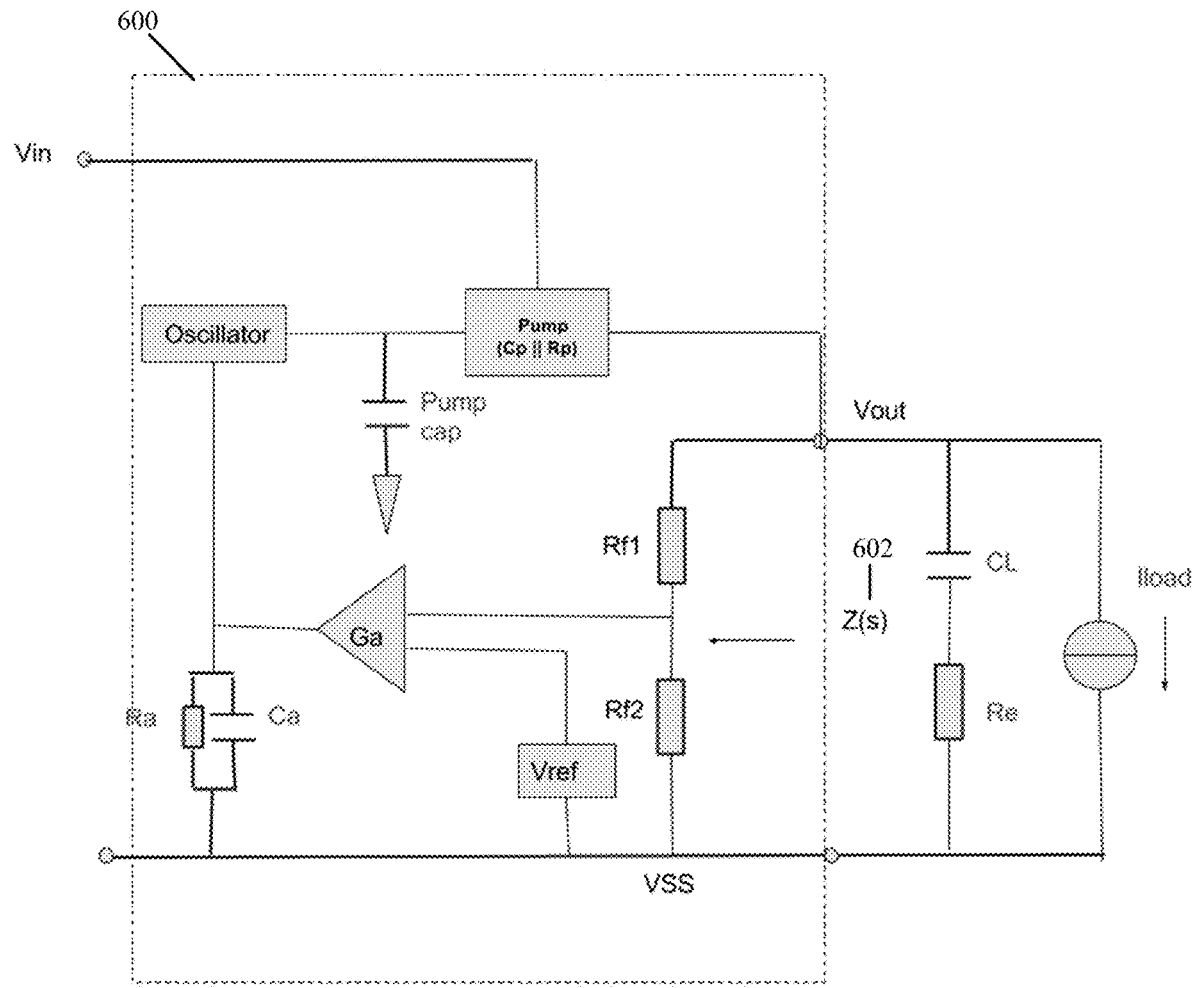
FIG. 6 depicts an exemplary AC model of a charge pump used in performing an AC analysis of the charge pump according to an embodiment of the present disclosure.

To illustrate an example of such an AC model, reference is made to FIG. 6. This figure depicts an exemplary AC model 600 of a charge pump that is used in performing an AC analysis of the charge pump according to embodiments of the present disclosure. The AC model 600 includes features for each of the components of the charge pump, including (i) a pump represented by a capacitor Cp in parallel in with a resistor Rp (i.e., Cp||Rp, as shown in FIG. 6), (ii) a feature Ga used in modeling the detector of the charge pump, (iii) Ra and Ca used in modeling the output impedance (e.g., Zout) of the detector, and (iv) Rf1 and Rf2 used in modeling the feedback network of the charge pump and Zout of the oscillator. The AC model 600 includes various other features for modeling the charge pump, as shown in the figure (e.g., oscillator, pump capacitor, reference voltage source). In the example of FIG. 6, the AC model 600 is coupled to a load, as represented by the CL, Re, and Iload features. The CL and Re features are representative of a capacitance and resistance, respectively, of the load or die to which the charge pump is coupled.

In FIG. 6, the LDO frequency-domain impedance function $Z(s)$ is shown at 602. In some embodiments, the impedance function $Z(s)$ may be referred to as a "transfer function" of the charge pump. As described above, in embodiments, a frequency-domain analysis is performed at multiple frequencies to determine the impedance function $Z(s)$, which is representative of the charge pump's impedance at each of the multiple frequencies. In some embodiments, the frequency-domain analysis comprises an automatic, algorithmic analysis of the charge pump that requires no human intervention or only minimal human intervention. In embodiments, the frequency-domain analysis is an AC analysis performed using an AC model of the charge pump, such as the AC model 600 illustrated in FIG. 6. The AC analysis of the charge pump is performed in a manner that is similar to that described above for performing the AC analysis of the LDO regulator.

With reference again to FIG. 5, at 506, a vector-fitting algorithm is applied to approximate the impedance function $Z(s)$ using a plurality of poles and residues. In some embodiments, the vector-fitting algorithm comprises a rational-vector fitting method that approximates the impedance function $Z(s)$ via Equation 1 above. In Equation 1, the impedance function $Z(s)$ is the impedance function of the charge pump, as determined via the AC, frequency-domain analysis described above with reference to operation 504 of FIG. 5. The output of the rational-vector fitting method comprises the residues r and poles p seen in Equation 1, which are either real quantities or complex conjugate pairs. The values d and h in Equation 1 are real quantities. In embodiments, the vector-fitting algorithm applied at 506 comprises an automatic, algorithmic analysis that requires no human intervention or only minimal human intervention. The vector-fitting analysis for the charge pump is performed in a manner that is similar to that described above for performing the vector-fitting analysis of the LDO regulator.

At 508, a circuit is synthesized based on the plurality of poles and residues determined via the operation 506. The synthesized circuit represents the AC, frequency-response behavior of the charge pump, in embodiments. The circuit that is synthesized at 508 may be (i) a second-order circuit when the residues and poles are complex conjugate pairs, and (ii) a first-order circuit when the residues and poles are real quantities. In embodiments, the synthesis of the circuit via the operation 508 comprises an automatic, algorithmic synthesis procedure that requires no human intervention or only minimal human intervention. The synthesis procedure for the charge pump is performed in a manner that is similar to that described above for performing the circuit synthesis for the LDO regulator.

Figure 7:
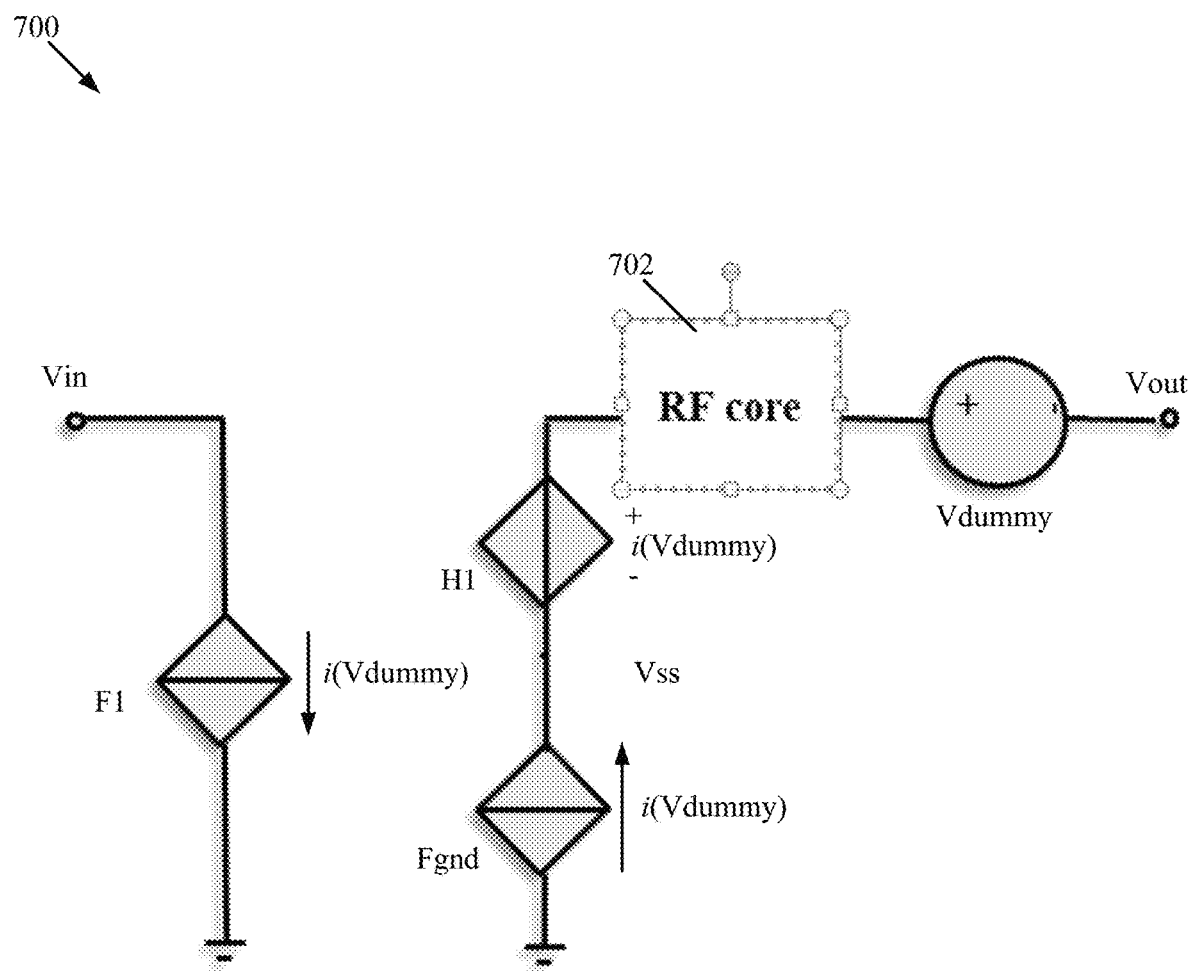
FIG. 7 depicts an exemplary model for a charge pump that includes a synthesized circuit and components that model a DC behavior of the charge pump according to an embodiment of the present disclosure.

At 510, a model for the charge pump is generated. The generated model includes (i) the circuit synthesized at the operation 508, and (ii) components that represent the low-frequency behavior (e.g., DC behavior) of the charge pump, as captured in the DC Iload-Vout table described above. To illustrate an example model for the charge pump that may be generated via the operation 510, reference is made to FIG. 7. This figure depicts an exemplary model 700 for a charge pump that includes the synthesized circuit and components that model the DC behavior of the charge pump according to an embodiment of the present disclosure. In FIG. 7, "Vin" is the input voltage to the model 700, and "Vout" is the output voltage. The RF core 702 represents the circuit that is synthesized via the operation 508, which captures the AC, frequency response behavior of the charge pump.

Other features included in the model 700 represent the DC behavior of the charge pump, as determined via the operation 502 described above. The DC behavior of the charge pump (e.g., as captured in the DC Iload-Vout table generated via the operation 502) dictates that when loading increases, the Vout output voltage of the charge pump decreases accordingly. The H1 feature shown in FIG. 7 is used to represent this DC behavior in the model 700 and comprises a current-controlled voltage source, in embodiments. The current-controlled voltage source operates such that as loading increases, the output voltage Vout decreases. The F1 and Fgnd features are current sources, in embodiments, and are used to ensure that the model 700 satisfies the rules of KCL. The Vdummy feature comprises a voltmeter, in embodiments.

After generating the model of the charge pump via the operation 510, the model can thereafter be used in circuit analysis tools to analyze the behavior of the charge pump within the contexts of various systems and chips. For example, in some embodiments, the circuit analysis tool includes an IR drop analysis tool that analyzes the behavior of the charge pump when coupled to a load or PDN. Various other analyses can be performed by using the generated model in a circuit analysis tool. Based on those analyses, a physical system can be designed or modified based on the determined results so as to produce a physical system that behaves as desired.

Figure 8:
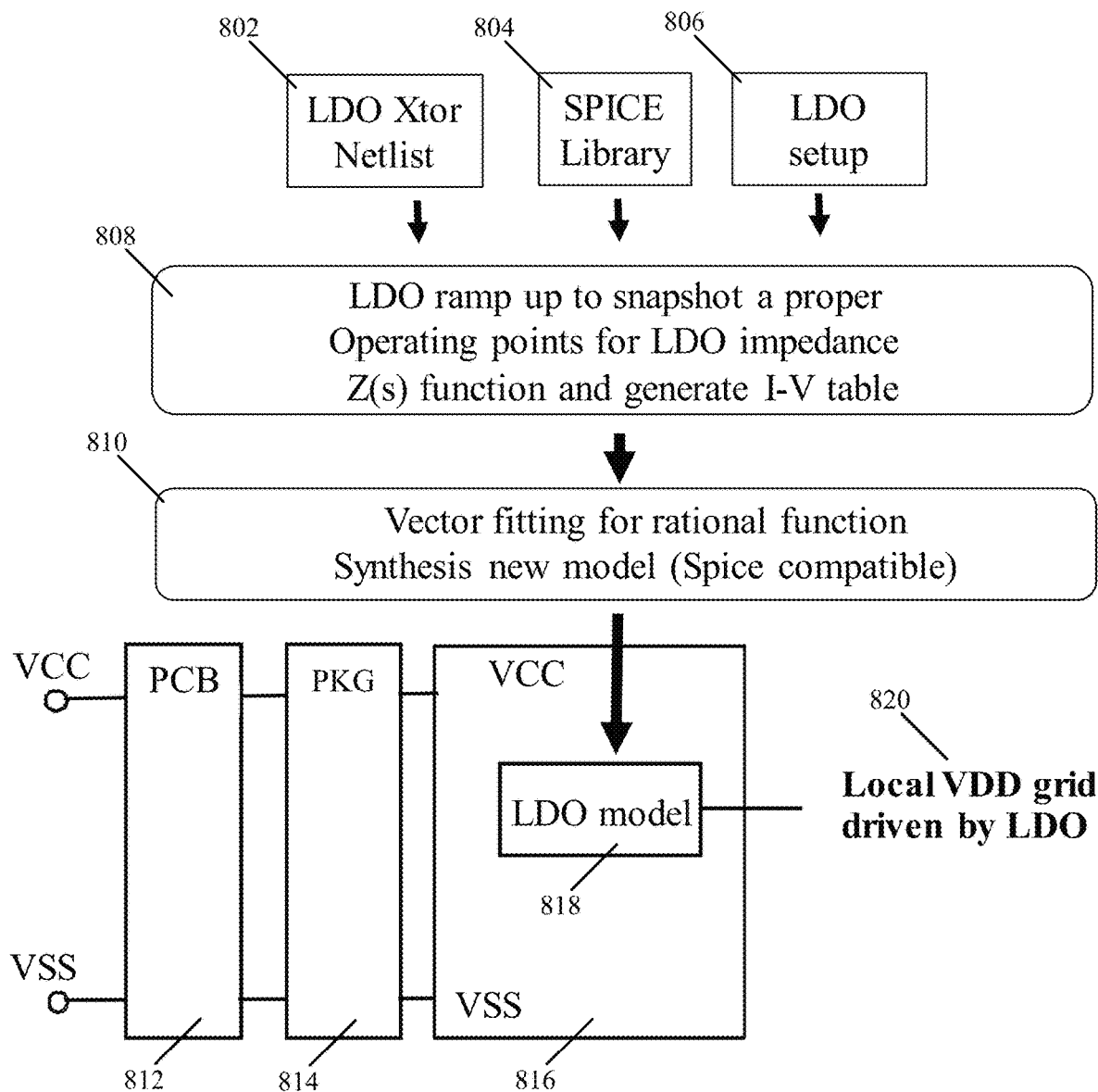
FIG. 8 depicts an exemplary application flow for generating and using an LDO model according to embodiments of the present disclosure.

FIG. 8 depicts an exemplary application flow for generating and using an LDO model according to embodiments of the present disclosure. As noted above, the LDO and charge pump models of the present disclosure can be applied to dynamic voltage (IR) drop analyses via various IR analysis tools, such as Redhawk and Totem. To facilitate such analyses, the operations shown in FIG. 8 may be performed. In performing these operations, an LDO Xtor Netlist 802, SPICE library 804, and LDO setup data 806 are received. At operation 808, an LDO ramp-up simulation is performed to generate a snapshot of proper operating points for the LDO impedance function Z(s) and for generating the DC Iload-Vout table. In some embodiments, an auto selection of pass element operating points is used to generate the LDO frequency-domain impedance function Z(s) for fitting. In performing the operation 808, to handle a typical or complex LDO, a correct bias (DC or current source) for LDO input is applied. Further, in performing the operation 808, dummy Cdie and step current are applied to stabilize LDO output. AC impedance of circuit nodes is bias dependent, and good operation points can result in more accurate AC impedance. Auto-selection means using different operations points to do AC simulation, and then selecting the best LDO model. Dummy Cdie and step current use capacitor and periodic step current sources to mimic the chip power noise during operation. After the LDO is ramped up via the operation 808, the LDO model for AC analysis is generated. An example model for AC analysis of an LDO regulator is illustrated in FIG. 3A and described above with reference to that figure.

At operation 810, vector fitting for rational function is utilized, and the LDO model 818 is generated. The LDO model 818 is SPICE-compatible, in embodiments, such that the LDO model 818 can be used in SPICE-compatible circuit analysis tools. Further, the LDO model 818 can be used in IR analysis tools directly, thus enabling accurate dynamic voltage drop analysis with LDO cells even with different PDNs and loadings. In this manner, the LDO model 818 is not dependent on characteristics of the PDN or loading to which it is coupled, as described above. Accordingly, the generated LDO model 818 corresponds to only the LDO regulator itself (e.g., and not the PDN or loading to which the LDO regulator is coupled), such that the LDO regulator can be independently characterized and used in multiple LDO circuits on-chip either driving different power domains or driving the same power domain.

When used in the circuit analysis tool, the LDO model 818 may be disposed on a chip 816 coupled to a PCB 812 and package 814, as illustrated in FIG. 8. The LDO model 818 generates a local VDD 820 (e.g., output voltage) based on an input voltage VCC. The LDO model 818 may also be coupled to a ground voltage VSS, as shown in the figure.

Although the operations of FIG. 8 are described in the context of the LDO regulator model, it is noted that similar operations are used in the context of the charge pump model presented herein. The charge pump model is SPICE-compatible, in embodiments, such that the charge pump model can be used in SPICE-compatible circuit analysis tools. Further, the charge pump model can be used in IR analysis tools directly, thus enabling accurate dynamic voltage drop analysis with charge pump cells even with different PDNs and loadings. In this manner, the charge pump model is not dependent on characteristics of the PDN or loading to which it is coupled, as described above. Accordingly, the generated charge pump model corresponds to only the charge pump itself, such that the charge pump can be independently characterized and used in multiple charge pump circuits on-chip either driving different power domains or driving the same power domain.

Although embodiments of the present disclosure are directed to modeling LDO regulators and charge pumps, the techniques of the present disclosure can be used to model a variety of other components (e.g., I/O drivers, etc.). It is thus noted the present disclosure has a much broader range of applicability than the particular embodiments described herein, and that the systems and methods of the present disclosure may be used to model a wide variety of components.

Figure 9A:
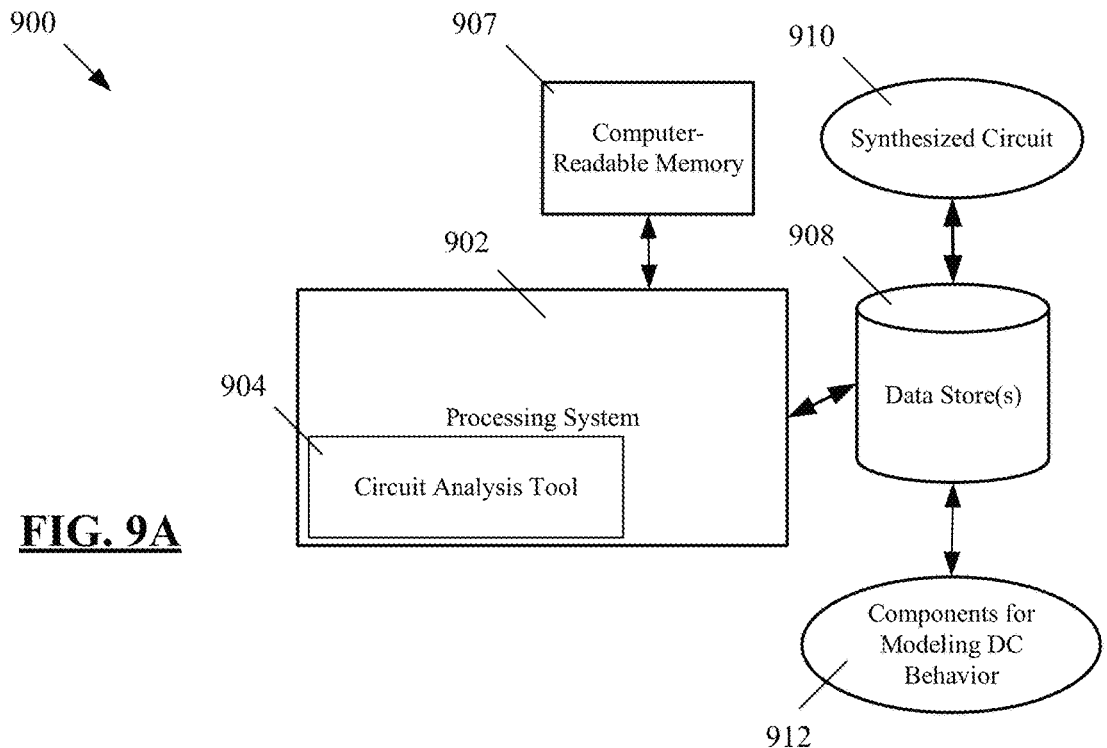
FIGS. 9A, 9B, and 9C depict example systems for implementing the techniques described herein.
Figure 9B:
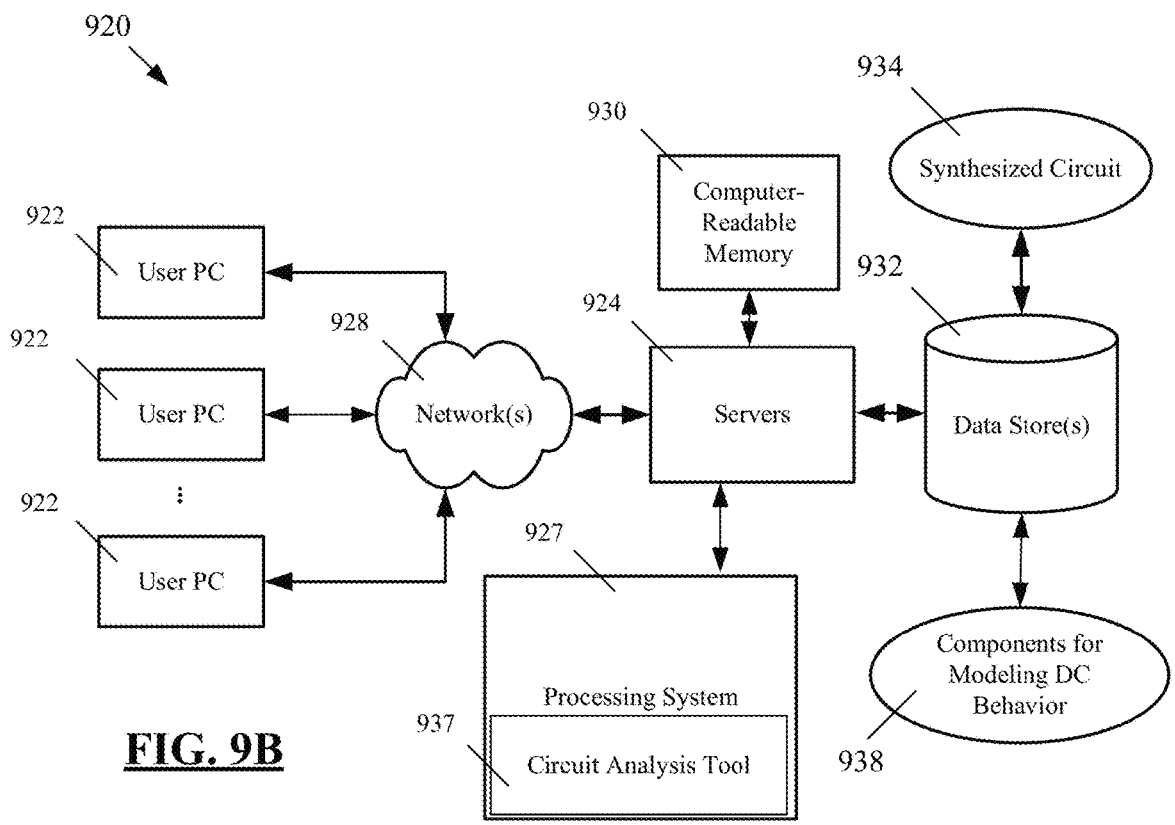
Figure 9C:
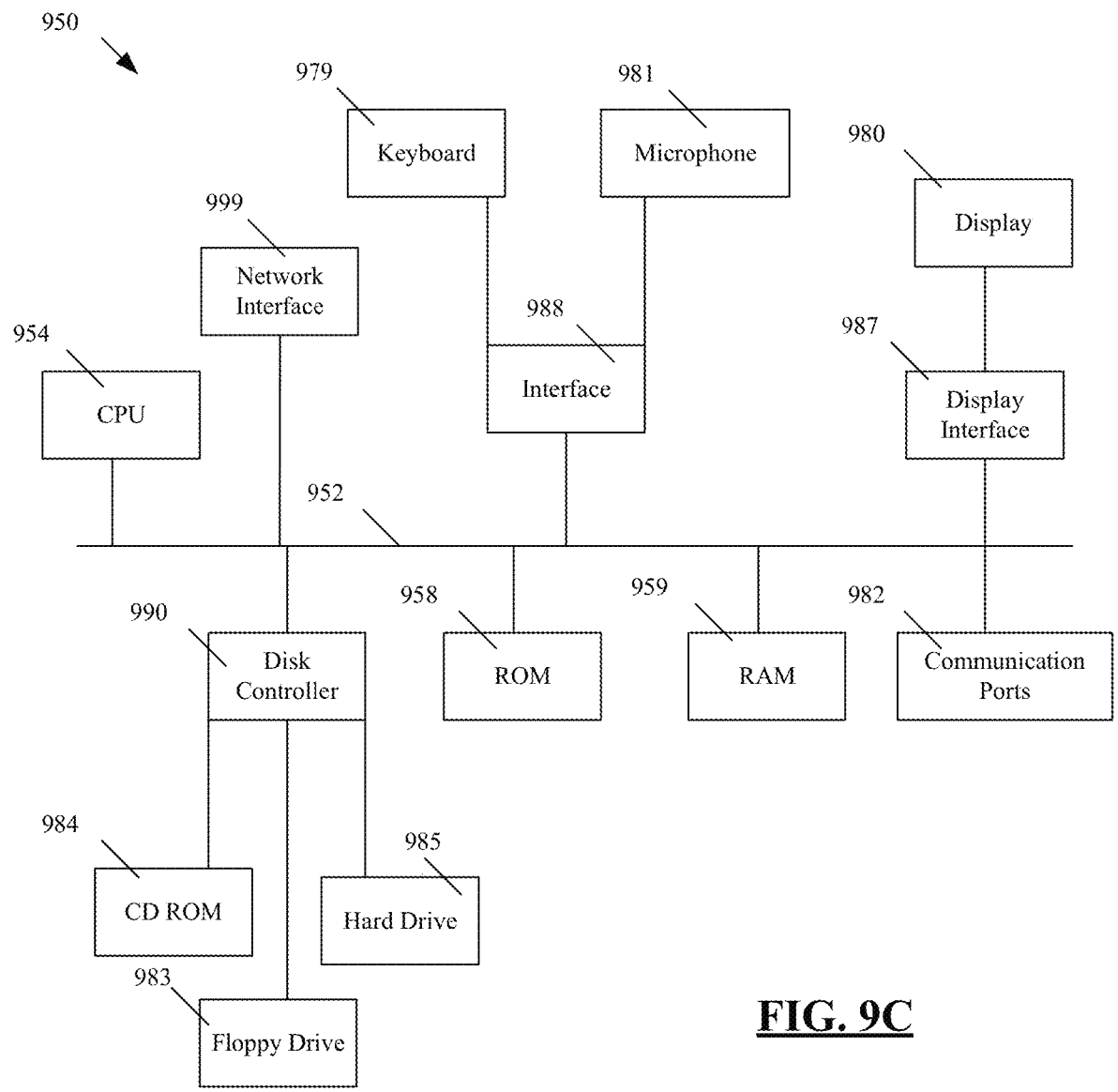

FIGS. 9A, 9B, and 9C depict example systems for implementing the techniques described herein. For example, FIG. 9A depicts an exemplary system 900 that includes a stand-alone computer architecture where a processing system 902 (e.g., one or more computer processors located in a given computer or in multiple computers that may be separate and distinct from one another) includes a circuit analysis tool 904 being executed on the processing system 902. The processing system 902 has access to a computer-readable memory 907 in addition to one or more data stores 908. The one or more data stores 908 may include data for a synthesized circuit 910 as well as data for components used in modeling a DC behavior of an LDO regulator or charge pump 912. The processing system 902 may be a distributed parallel computing environment, which may be used to handle very large-scale data sets.

FIG. 9B depicts a system 920 that includes a client-server architecture. One or more user PCs 922 access one or more servers 924 running a circuit analysis tool 937 on a processing system 927 via one or more networks 928. The one or more servers 924 may access a computer-readable memory 930 as well as one or more data stores 932. The one or more data stores 932 may include data for a synthesized circuit 934 as well as data for components used in modeling a DC behavior of an LDO regulator or charge pump 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing methods (e.g., algorithms) for modeling an LDO regulator or charge pump. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984 may include one or more data structures for storing and associating various data used in the example systems for modeling an LDO regulator or charge pump. For example, a data structure stored in any of the aforementioned locations may be used to store data for a synthesized circuit and/or data for components used in modeling a DC behavior of an LDO regulator or charge pump. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick. Such data input devices communicate with the standalone computer architecture 950 via an interface 988, in some embodiments. The standalone computer architecture 950 further includes a network interface 999 that enables the architecture 950 to connect to a network, such as a network of the one or more networks 928.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for modeling a low-dropout (LDO) regulator comprising:
    determining a relationship between an output voltage of an LDO regulator and a loading condition;
    performing a frequency-domain analysis at multiple frequencies with a processing system to determine an impedance function representative of the LDO regulator's impedance at each of the multiple frequencies;
    applying a vector-fitting algorithm with the processing system to approximate the impedance function using a plurality of poles and residues;
    synthesizing a circuit with the processing system based on the plurality of poles and residues; and
    generating a model for the LDO regulator that includes the synthesized circuit and components that model the relationship between the output voltage and the loading condition.

2. The computer-implemented method of claim 1, wherein the determining of the relationship comprises:
    generating a data structure comprising a plurality of entries, each entry including (i) an amount of current delivered to a load to which the LDO regulator is coupled, and (ii) the LDO regulator's output voltage when the amount of current is being delivered.

3. The computer-implemented method of claim 1, wherein the vector-fitting algorithm comprises a rational vector-fitting algorithm that approximates the impedance function via an equation $$Z(s) \approx \sum_{n=1}^{3} \frac{r}{s-p} + hs + d,$$

where s represents a frequency of the multiple frequencies, Z(s) represents the impedance function, r represents the residues, p represents the poles, and d and h represent real numbers.

4. The computer-implemented method of claim 1, wherein
    the synthesized circuit is a second-order circuit when the residues and poles are complex conjugate pairs, and
    the synthesized circuit is a first-order circuit when the residues and poles are real quantities.

5. The computer-implemented method of claim 1, wherein the determining of the relationship comprises:
    performing a DC analysis to determine the relationship.

6. The computer-implemented method of claim 1, wherein the components that model the relationship between the output voltage and the loading condition comprise:
    a current-controlled voltage source that causes the output voltage to decrease when loading on the LDO regulator increases.

7. The computer-implemented method of claim 1, further comprising:
    using the model in a computer-based circuit analysis tool.

8. The computer-implemented method of claim 7, wherein the computer-based circuit analysis tool comprises a dynamic voltage (IR) drop analysis tool, the model and the IR drop analysis tool being used to analyze behavior of the LDO regulator when coupled to a load or power delivery network.

9. The computer-implemented method of claim 8, wherein the IR drop analysis tool comprises Redhawk or Totem.

10. The computer-implemented method of claim 1, wherein
the synthesized circuit represents an AC behavior of the LDO regulator, and
the relationship between the output voltage and the loading condition represents a DC behavior of the LDO regulator.

11. The method of claim 1, wherein the relationship between the output voltage of the LDO regulator and the loading condition is determined based on a physical LDO regulator being modeled.

12. The method of claim 1, further comprising:
performing a simulation analysis based on the model for the LDO regulator;
wherein an existing physical system or a physical system being designed is adjusted based on results of the simulation analysis.

13. A system for modeling a low-dropout (LDO) regulator, the system comprising:
a processing system; and
computer-readable memory in communication with the processing system encoded with instructions for commanding the processing system to execute steps comprising:
determining a relationship between an output voltage of an LDO regulator and a loading condition;
performing a frequency-domain analysis at multiple frequencies to determine an impedance function representative of the LDO regulator's impedance at each of the multiple frequencies;
applying a vector-fitting algorithm to approximate the impedance function using a plurality of poles and residues;
synthesizing a circuit based on the plurality of poles and residues; and
generating a model for the LDO regulator that includes the synthesized circuit and components that model the relationship between the output voltage and the loading condition.

14. A non-transitory computer-readable storage medium for modeling a low-dropout (LDO) regulator, the computer-readable storage medium comprising computer executable instructions which, when executed, cause a processing system to execute steps comprising:
determining a relationship between an output voltage of an LDO regulator and a loading condition;
performing a frequency-domain analysis at multiple frequencies to determine an impedance function representative of the LDO regulator's impedance at each of the multiple frequencies;
applying a vector-fitting algorithm to approximate the impedance function using a plurality of poles and residues;
synthesizing a circuit based on the plurality of poles and residues; and
generating a model for the LDO regulator that includes the synthesized circuit and components that model the relationship between the output voltage and the loading condition.

* * * * *